United States Patent
Devadoss et al.

(10) Patent No.: US 7,754,818 B2
(45) Date of Patent: Jul. 13, 2010

(54) GAP FILL MATERIALS AND BOTTOM ANTI-REFLECTIVE COATINGS COMPRISING HYPERBRANCHED POLYMERS

(75) Inventors: Chelladurai Devadoss, Hillsboro, OR (US); Mandar Bhave, Austin, TX (US); Runhui Huang, Rolla, MO (US)

(73) Assignee: Brewer Science Inc., Rolla, MO (US)

( * ) Notice: Subject to any disclaimer, the term of this patent is extended or adjusted under 35 U.S.C. 154(b) by 310 days.

(21) Appl. No.: 11/032,930

(22) Filed: Jan. 11, 2005

(65) Prior Publication Data

US 2006/0155017 A1  Jul. 13, 2006

(51) Int. Cl.
*C08F 8/00* (2006.01)
*C08F 16/02* (2006.01)
*C08F 16/12* (2006.01)
*C08F 20/06* (2006.01)
*C08F 118/02* (2006.01)
*C08F 2/00* (2006.01)
*C08F 4/00* (2006.01)

(52) U.S. Cl. .............. 525/326.1; 525/328.8; 525/328.9; 526/317.1; 526/319; 526/219.5; 526/217

(58) Field of Classification Search .............. 525/326.1, 525/328.8, 328.9; 526/317.1, 319, 219.5, 526/217
See application file for complete search history.

(56) References Cited

U.S. PATENT DOCUMENTS

| 4,631,337 | A | 12/1986 | Tomalia et al. | |
|---|---|---|---|---|
| 5,041,516 | A | 8/1991 | Frechet et al. | |
| 5,418,301 | A | 5/1995 | Hult et al. | |
| 5,705,602 | A * | 1/1998 | Kawashima et al. | ........ 528/310 |
| 6,211,329 | B1 | 4/2001 | Rehnberg et al. | |
| 6,391,472 | B1 | 5/2002 | Lamb, III et al. | |
| 6,444,320 | B1 | 9/2002 | Takei et al. | |
| 6,569,956 | B1 | 5/2003 | Ramesh | |
| 6,617,418 | B1 | 9/2003 | Magnusson et al. | |
| 6,630,520 | B1 * | 10/2003 | Bruza et al. | ................... 521/77 |
| 2001/0011109 | A1 * | 8/2001 | Tomalia et al. | ............... 523/105 |

OTHER PUBLICATIONS

Kim et al., "Dendrimer-supported combinatorial chemistry," Proc. Natl. Acad. Sci., vol. 93, Sep. 1996, pp. 10012-10017.
Product Information re: Starburst, Dendritic Nanotechnologies, Inc., 2008, http://dnanotech.com/starburst... 2 pages.
Magnusson et al., "Synthesis of hyperbranched aliphatic polyethers via cationic ring-opening polymerization of 3-ethyl-3(hydroxymethyl)oxetane," Macromolecular Rapid Communications, vol. 20, Issue 8, 1999, pp. 453-457, http://www3.interscience.wiley.com/journal....1 page abstract.

(Continued)

*Primary Examiner*—William K Cheung
(74) *Attorney, Agent, or Firm*—Hovey Williams LLP

(57) ABSTRACT

New anti-reflective or fill compositions having improved flow properties are provided. The compositions comprise a dendritic polymer dispersed or dissolved in a solvent system, and preferably a light attenuating compound, a crosslinking agent, and a catalyst. The inventive compositions can be used to protect contact or via holes from degradation during subsequent etching in the dual damascene process. The inventive compositions can also be applied to substrates (e.g., silicon wafers) to form anti-reflective coating layers having high etch rates which minimize or prevent reflection during subsequent photoresist exposure and developing.

11 Claims, 5 Drawing Sheets

OTHER PUBLICATIONS

Sunder et al., "Hyperbranched Polyether Polyols: A Modular Approach to Complex Polymer Architectures," Advanced Materials, vol. 12, Issue 3, 2000, pp. 235-239, http://www3.interscience.wiley.com/journal.... 1 page abstract.

Frechet et al., "The control of molecular architecture in reactive polymers: New dendritic macromolecules with controlled surface functionalities." Reactive Polymers, vol. 15, Nov. 1991, p. 222, www.sciencedirect.com.... 2 page abstract.

Cymel 303LF Crosslinking Agents General Product Information, Cytec Industries Inc., 2000, 3 pages.

Malkoch et al., "Dendritic Oxazoline Ligands in Enantioselective Palladium-Catalyzed Allylic Alkylations," J. Org. Chem., 2002, 67, 819/-8202.

Tomalia et al., "Discover of Dendrimers and Dendritic Polymers: A Brief Historical Perspective," J. Polym. Sci. Part A: Polym. Chem.: vol. 40 (2002), 2719-2728.

Dendritich, Inc., General , Pricing and Ordering, and Selected Reference Information, 2008, http://www.dendritech.com, 6 pages.

Diez-Barra et al., "Synthesis of periphery-functionalized dendritic polyethers," Tetrahedron, vol. 60, Issue 7, Feb. 9, 2004, pp. 1563-1569, www.sciencedirect.com/science.... 3 page abstract.

Padias et al., "Starburst Polyether Dendrimers," J. Org. Chem., 1987, 52, p. 5305-5312, see p. 5305.

Borah et al., "Synthesis and characterization of a novel hyperbranched polyether," Polymer International, vol. 53, No. 12, Dec. 2004, pp. 2026-2030(5), http://www.ingentaconnect.com.... 2 page abstract.

Archut et al., "Functional Cascade Molecules," Chemical Society Reviews, 1998, vol. 27, pp. 233-240.

Hawker et al., "Molecular Ball Bearings: The Unusual Melt Viscosity Behavior of Dendritic Macromolecules," J. Am. Chem. Soc., 1995, 117, 4409-4410, see page 4409.

Gao et al., "Preparation and characterization of fluorescent hyperbranched polyether," Reactive and Functional Polymers, vol. 58, Issue 1, Jan. 2004, pp. 65-72, 2 page abstract.

http://www.egr.msu.edu/~mackay/mmackay-dendrimer.htm, "What is a dendrimer?", 2000-2001 All rights reserved M.E. Mackay.

http://pubs.acs.org/hotartcl/cenear/960603/dend.html, Dagani, Ron, "Chemist Explore Potential of Dendritic Macromolecules as Functional Materials," Chemical and Engineering News, Jun. 3, 1996, Copyright 1996 by the American Chemical Society.

http://flux.aps.org/meetings/YR97/BAPSMAR97/abs/G5255006.html, Hyperbranched Polymer, Young H. Kim (DuPont, CR&D), Dec. 3, 1996.

Botorn Dendritic Poymers, Perstorp, (Exhibit A) 16 pages, Jan. 1, 2004.

Sigma-Aldrich, http://www.sigmaaldrich.com/catalog/search/SearchResultsPage, (Exhibit B) 4 pages, (2007).

Polymer Factory, http://www.polymerfactory.com/products/index.htm, (Exhibit C) 4 pages, (2008).

* cited by examiner

Types of Macromolecular Architectures

Linear

Random Coil

Branched

Random Short Branches

Cross-Linked

Lightly Cross-Linked

Dendritic

Dendrimers

GAP FILL MATERIALS AND BOTTOM ANTI-REFLECTIVE COATINGS COMPRISING HYPERBRANCHED POLYMERS

FEDERALLY SPONSORED RESEARCH/DEVELOPMENT PROGRAM

This invention was made with Government support under contract MDA Phase III Contract #DASG60-01-C-0047. The Government has certain rights in the invention.

BACKGROUND OF THE INVENTION

1. Field of the Invention

The present invention is concerned with new anti-reflective compositions and via fill compositions for use in the manufacture of microelectronic devices. These compositions include a dendritic polymer dispersed or dissolved in a solvent system.

2. Description of the Prior Art

1. Anti-reflective Coatings

Integrated circuit manufacturers are consistently seeking to maximize substrate wafer sizes and minimize device feature dimensions in order to improve yield, reduce unit case, and increase on-chip computing power. Device feature sizes on silicon or other chips are now submicron in size with the advent of advanced deep ultraviolet (DUV) microlithographic processes.

However, a frequent problem encountered by photoresists during the manufacturing of semiconductor devices is that activating radiation is reflected back into the photoresist by the substrate on which it is supported. Such reflectivity tends to cause blurred patterns which degrade the resolution of the photoresist. Degradation of the image in the processed photoresist is particularly problematic when the substrate is non-planar and/or highly reflective. One approach to address this problem is the use of an anti-reflective coating applied to the substrate beneath the photoresist layer.

In the semiconductor industry, two broad types of bottom anti-reflective coatings have been used: organic and inorganic. Inorganic bottom anti-reflective coatings like SiON and TiN are deposited by plasma-enhanced, chemical vapor deposition techniques (PEVCD). These inorganic films are conformal and difficult to remove after the photolithography step. On the other hand, organic bottom anti-reflective coatings are planarizing, are deposited by a cost-effective spin-coating process, and can be easily removed by dry etching or stripping using wet chemicals.

Organic bottom anti-reflective coatings are formulated based on linear chain polymers which have crosslinkable sites. Light attenuating chromophores are grafted to these linear polymers to absorb light at the exposure wavelengths. For example, linear chain acrylate polymers have been used as the basic structure to formulate bottom anti-reflective coatings. Aliphatic polyester polymers have also been used. One major drawback of linear chain polymers, however, is that they undergo chain entanglements, leading to poor flow properties, particularly when used as fill compositions as discussed below.

2. Fill Compositions

The damascene process, or the process of forming inlaid metal patterning in preformed grooves, is generally a preferred method of fabricating interconnections for integrated circuits. In its simplest form, the dual damascene process starts with an insulating layer which is first formed on a substrate and then planarized. Horizontal trenches and vertical holes (i.e., the contact and via holes) are then etched into the insulating layer corresponding to the required metal line pattern and hole locations that will descend down through the insulating layer to the device regions (if through the first insulating layer, i.e., a contact hole) or to the next metal layer down (if through an upper insulating layer in the substrate structure, i.e., a via hole). Metal is next deposited over the substrate, thereby filling the trenches and the holes and forming the metal lines and interconnect holes simultaneously. As a final step, the resulting surface is planarized (e.g., by the known chemical-mechanical polish (CMP) technique) and readied to accept another damascene structure.

During the dual damascene process, the contact and via holes are typically etched to completion prior to the trench etching. Thus, the step of trench etching exposes the bottom and sidewalls (which are formed of the insulating or dielectric layer) of the contact or via holes to over-etch which can deteriorate contact with the base layer. An organic material is typically used to partially or completely fill the via or contact holes and to protect the bottom and sidewalls from further etch attack. These organic fill materials can also serve as a bottom anti-reflective coating (as discussed above) to reduce or eliminate pattern degradation and linewidth variation in the patterning of the trench layer, provided the fill material covers the surface of the dielectric layer.

Fill materials which have high optical density at the typical exposure wavelengths have been used for the past several years. However, most prior art materials have limited fill properties. For example, when the prior art compositions are applied to the via or contact holes formed within the substrate, the films formed by the compositions tend to be quite thin on the substrate surface immediately adjacent the holes, thus leading to undesirable light reflection during subsequent exposure steps. Also, the flow properties of the composition tend to be lacking in that the composition does not completely flow into via and contact holes, resulting in inadequate protection of those holes.

There is a need in the art for contact or via hole fill materials which provide complete coverage at the top of via and contact holes. Furthermore, this material should properly flow into the via and contact holes to protect the base during etching and prevent degradation of the barrier layer and damage to the underlying metal conductors.

SUMMARY OF THE INVENTION

The present invention is broadly concerned with new anti-reflective or fill compositions and methods of using those compositions to protect substrates, and particularly contact and via holes formed therein, during circuit manufacturing.

In more detail, the compositions comprise a dendritic polymer dispersed or dissolved in a solvent system. Preferred dendritic polymers include both dendrimers and hyperbranched polymers. It is particularly preferred that the dendritic polymer have a viscosity of less than about $150 \times 10^3$ cP, and more preferably from about $7 \times 10^3$ to about $110 \times 10^3$ cP. The average molecular weight (as determined by Gel Permeation Chromatography/Size Exclusion Chromatography) of the dendritic polymer is preferably less than about 15,000 g/mole, more preferably from about 800-5,200 g/mole, and more preferably from about 1,500-5,200 g/mole.

In one embodiment, the dendritic polymer should have a hydroxyl number (as determined by ASTM E-222) of at least about 100 mg KOH/g of dendritic polymer, preferably from about 300-600 mg KOH/g of dendritic polymer, and more preferably from about 500-600 mg KOH/g of dendritic polymer.

Particularly preferred dendritic polymers include those selected from the group consisting of dendritic polyesters, dendritic polyols, dendritic polyethers, dendritic polyamines, dendritic carboxylic acids, and mixtures thereof.

The inventive compositions generally have an overall solids content of from about 0.5-10% and can be prepared by simply dissolving or dispersing the dendritic polymer in a suitable solvent system. The solvent system should have a boiling point of from about 100-200° C., and preferably from about 120-170° C. The amount of dendritic polymer dissolved in the solvent system is from about 0.2-10% by weight dendritic polymer, preferably from about 2-7% by weight dendritic polymer, and more preferably from about 3-6% by weight dendritic polymer, based upon the total weight of the composition taken as 100% by weight.

The solvent system should be utilized at a level of from about 90-99% by weight, preferably from about 93-98% by weight, and more preferably from about 94-97% by weight, based upon the total weight of the composition taken as 100% by weight. Preferred solvent systems include a solvent selected from the group consisting of propylene glycol monomethyl ether (PGME), propylene glycol monomethyl ether acetate (PGMEA), ethyl lactate, propylene glycol n-propyl ether (PnP), cyclohexanone, tetrahydrofuran (THF), dimethyl formarnide (DMF), γ-butyrolactone, 2-heptanone, N-methyl pyrrolidone, and mixtures thereof.

Preferably, the inventive compositions further comprise a compound selected from the group consisting of crosslinking agents, catalysts, light attenuating compounds, and mixtures thereof. Preferred crosslinking agents include those selected from the group consisting of melamines and glycourils (e.g., POWDERLINK® 1174, Cymel® products), multifunctional epoxy resins (e.g., MY720, CY179MA, DENACOL), anhydrides, and mixtures thereof. The crosslinking agent should be present in the composition at a level of from about 0.2-5% by weight, and preferably from about 0.5-3% by weight, based upon the total weight of the composition taken as 100% by weight. Thus, the compositions of the invention should crosslink at a temperature of from about 100-250° C., and more preferably from about 150-205° C.

Preferred catalysts include sulfonic acids (e.g., p-toluenesulfonic acid, styrene sulfonic acid), thermal acid generators (e.g., pyridinium tosylate), carboxylic acids (e.g., trichloroacetic acid, benzene tetracarboxylic acid), sulfonates (e.g., pyridinium trifluoromethanesulfonate, pyridinium 3-nitrobenzenesulfonate), and mixtures thereof. The catalyst should be present in the composition at a level of from about 0.2-1% by weight, and preferably from about 0.3-0.6% by weight, based upon the total weight of the composition taken as 100% by weight.

Preferred light attenuating compounds include those selected from the group consisting of anthracenes (e.g., 9-anthracene carboxylic acid, 9-hydroxy methyl anthracene), naphthalenes (e.g., 3-hydroxy-2-naphthoic acid, 1,4-dihydroxy-2-naphthoic acid), phenyls (e.g., 4-hydroxybenzoic acid, 3,4-hydroxy benzoic acid), and mixtures thereof. The light attenuating compound should be present in the composition at a level of from about 0.5-4% by weight, and preferably from about 1-2% by weight, based upon the total weight of the composition taken as 100% by weight.

The method of applying the anti-reflective or fill compositions to a substrate having a contact or via hole simply comprises applying a quantity of a composition hereof to the substrate surfaces forming the hole by any conventional application method (including spincoating). Advantageously the inventive compositions will have low viscosities (e.g., less than about 10 cP, more preferably from about 2-7 cP, and ever more preferably from about 3-5 cP) at this stage, thus providing superior coverage.

After the desired coverage is achieved, the resulting fill composition layer should be heated to at least about the crosslinking temperature (e.g., from about 100-250° C.) of the composition so as to cure the layer. Because of the superior coverage and flow properties of the present inventive composition, the thickness of the cured fill material layer on the surface of the substrate adjacent the edge of the contact or via hole will be at least about 50%, preferably at least about 55%, and more preferably at least about 65% of the thickness of the film on the substrate surface a distance away from the edge of the contact or via hole approximately equal to the diameter of the hole, even with hole diameters as small as about 0.1-0.2 μm in diameter and/or about 0.5-0.8 μm in depth.

Cured compositions according to the invention exhibit particularly good properties at wavelengths of less than about 400 nm. For example, they have high etch rates. The cured compositions have an etch selectivity to resist (i.e., the anti-reflective coating layer etch rate divided by the photoresist etch rate) of at least about 1.1, and preferably at least about 1.2, when $CF_4$ is used as the etchant. Additionally, at 193 nm and 248 nm exposure wavelengths, the cured compositions can form layers having a k value (i.e., the imaginary component of the complex index of refraction) of at least about 0.3, and preferably at least about 0.4, and an n value (i.e., the real component of the complex index of refraction) of at least about 1.0, and preferably at least about 1.5 at film thicknesses of from about 150-190 μm.

Furthermore, the cured coatings according to the invention will be substantially insoluble in typical photoresist solvents. Thus, when subjected to a stripping test, the inventive anti-reflective coating layers will have a percent stripping of less than about 5%, preferably less than about 1%, and even more preferably about 0%. The stripping test involves first determining the thickness (by taking the average of measurements at five different locations) of a cured film. This is the average initial film thickness. Next, a solvent (e.g., ethyl lactate) is puddled onto the cured film for about 10 seconds, followed by spin drying at about 2,000-3,500 rpm for about 20-30 seconds to remove the solvent. The film thickness is measured again at five different points on the wafer using ellipsometry, and the average of these measurements is determined. This is the average final film thickness.

The amount of stripping is the difference between the initial and final average film thicknesses. The percent stripping is:

$$\% \text{ stripping} = \left(\frac{\text{amount of stripping}}{\text{initial average film thickness}}\right) \times 100.$$

A photoresist can be applied to the cured material, followed by drying (soft bake), exposing, post-exposure baking, and developing the photoresist. Following the methods of the invention will yield precursor structures for dual damascene and other microlithographic processes which have the foregoing desirable properties.

DETAILED DESCRIPTION OF THE PREFERRED EMBODIMENTS

Polymeric architectures can be divided into different types. One type of polymeric architecture is the dendritic macromolecules. Dendritic molecules can be divided into two subtypes—dendrimers and hyperbranched polymers. Dendrimers are symmetrical and globular structures (i.e., they're monodisperse, tree-like structures) which have well-defined branches radiating from a central core. The structure becomes more branched and crowded at the outer periphery thereof.

Figure 1:
FIG. 1 is a schematic drawing showing various types of known macromolecular architecture.
Figure 1:
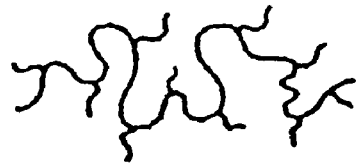
Figure 1:
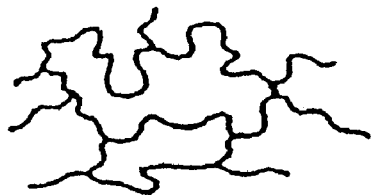
Figure 1:
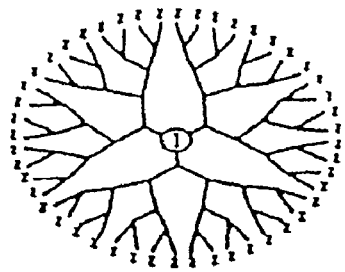
Figure 2:
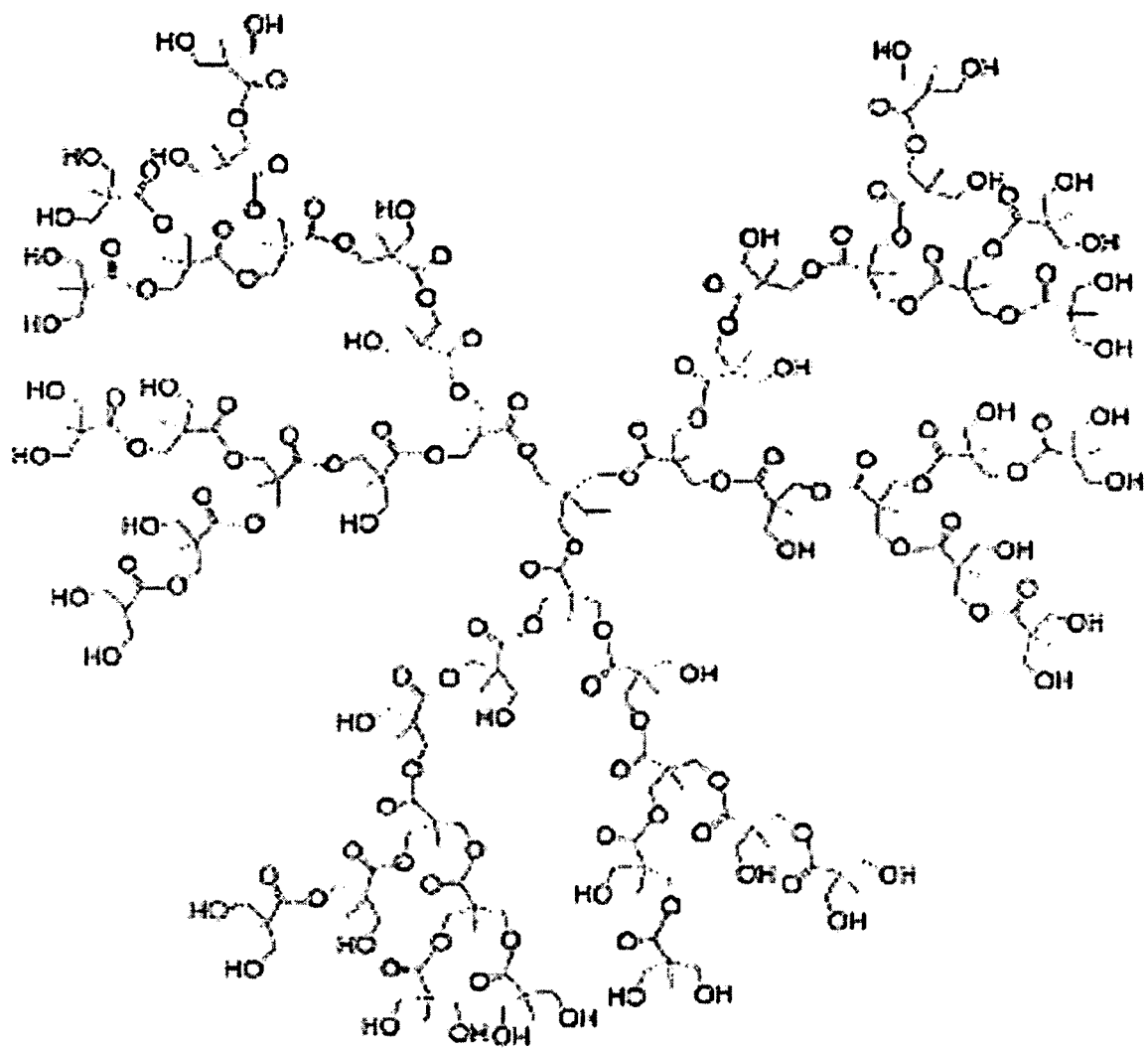
FIG. 2 is a schematic drawing showing a typical hyperbranched polymer.

Hyperbranched polymers also have a fractal pattern of chemical bonds, but the branches of hyperbranched polymers don't radiate from a central core (i.e., they're polydisperse). Furthermore, hyperbranched polymers have a degree of branching that is less than <1. FIG. 1 shows examples of both of these types of structures as well as linear and cross-linked polymers for comparison purposes.

Dendritic polymers are different from linear polymers in that they don't have entangled chains, and they have numerous side chains which can be functionalized. The advantages of dendritic polymers include their low hydrodynamic volumes and the compactness of the high generations of these macromolecules.

EXAMPLES

The following examples set forth preferred methods in accordance with the invention. It is to be understood, however, that these examples are provided by way of illustration and nothing therein should be taken as a limitation upon the overall scope of the invention.

Example 1

Formulation of Gap Fill Material for Exposure Wavelengths of Less than 400 nm

In this example, a gap fill material was prepared by mixing 5.65% by weight of BOLTORN H40 (a hyperbranched polymer having a molecular weight of 5100 g/mole and available from Perstorp Specialty Chemicals AB, Sweden), 0.05% by weight of CYMEL 303LF (a crosslinking agent available from Cytec Industries), 1.31% by weight of POWDERLINK 1174 (a crosslinking agent available from Cytec Industries), 0.018% by weight of p-toluenesulfonic acid (pTSA), 0.32% by weight of Bisphenol-A, 91.652% by weight of propylene glycol monomethyl ether (PGME), and 1.0% by weight of propylene glycol monomethyl ether acetate (PGMEA). The solution was coated onto a silicon wafer at 1500 rpm for 60 seconds and then baked at 205° C. for 60 seconds. The film thickness was 190 nm measured on an ellipsometer. The refractive index, n, was 1.60 at a wavelength of 248 m and 1.71 at a wavelength of 193 nm. The extinction coefficient, k, was 0.00 at a wavelength of 248 nm and 0.05 at a wavelength of 193 nm.

Example 2

Formulation of Gap Fill Material for Exposure Wavelengths of Less than 400 nm

In this example, a gap fill material was prepared by mixing 5.65% by weight of BOLTORN H20 (a hyperbranched polymer having a molecular weight of 5100 g/mole and available from Perstorp Specialty Chemicals AB, Sweden), 0.05% by weight of CYMEL 303LF, 1.31% by weight of POWDERLINK 1174, 0.018% by weight of pTSA, 0.32% by weight of Bisphenol-A, 91.652% by weight of PGME, and 1.0% by weight of PGMEA. The solution was coated onto a silicon wafer at 1500 rpm for 60 seconds and then baked at 205° C. for 60 seconds. The film thickness was 183 nm measured on an ellipsometer. The refractive index, n, was 1.60 at a wavelength of 248 nm and 1.70 at a wavelength of 193 nm. The extinction coefficient, k, was 0.00 at a wavelength of 248 nm and 0.05 at a wavelength of 193 mm.

Example 3

Formulation of Gap Fill Material for Exposure Wavelengths of Less than 400 nm

In this example, a gap fill material was prepared by mixing 5.65% by weight of BOLTORN H30 (a hyperbranched polymer having a molecular weight of 5100 g/mole and available from Perstorp Specialty Chemicals AB, Sweden), 0.05% by weight of CYMEL 303LF, 1.31% by weight of POWDERLINK 1174, 0.018% by weight of pTSA, 0.32% by weight of Bisphenol-A, 91.652% by weight of PGME, and 1.0% by weight of PGMEA. The solution was coated onto a silicon wafer at 1500 rpm for 60 seconds and then baked at 205° C. for 60 seconds. The film thickness was 186 nm measured on an ellipsometer. The refractive index, n, was 1.60 at a wavelength of 248 nm and 1.70 at a wavelength of 193 nm. The extinction coefficient, k, was 0.01 at a wavelength of 248 nm and 0.05 at a wavelength of 193 mm.

Example 4

Bottom Anti-Reflective Coating Formulation for 248 nm Exposure

In this example, a bottom anti-reflective coating was prepared by mixing 2.8% by weight of BOLTORN H40, 1.4% by weight of 9-anthracene carboxylic acid (9-ACA, a chromophore), 1.7% by weight of CYMEL 303LF, 0.2% by weight of pyridinium p-toluenesulfonate (PPTS), 46.8% by weight of PGME, and 47.1% by weight ethyl lactate (EL). The solution was coated onto a silicon wafer at 1500 rpm for 60 seconds and then baked at 160° C. for 60 seconds. The film thickness was 157 nm measured on an ellipsometer. The refractive index, n, was 1.60 at a wavelength of 248 nm. The extinction coefficient, k, was 0.40 at a wavelength of 248 nm.

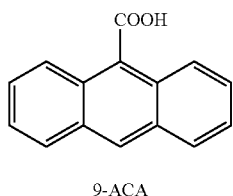

9-ACA

Example 5

Bottom Anti-Reflective Coating Formulation for 248 nm Exposure

In this example, a bottom anti-reflective coating was prepared by mixing 2.8% by weight of BOLTORN H40, 1.4% by weight of 3-hydroxy-2-naphthoic acid (a chromophore), 1.7% by weight of CYMEL 303LF, 0.2% by weight of PPTS, 46.8% by weight of PGME, and 47.1% by weight EL. The solution was coated onto a silicon wafer at 1500 rpm for 60 seconds, and then baked at 160° C. for 60 seconds. The film thickness was 153 nm measured on an ellipsometer. The refractive index, n, was 1.79 at a wavelength of 248 nm. The extinction coefficient, k, is 0.27 at a wavelength of 248 nm.

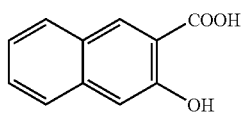

3-Hydroxy-2-naphthoic Acid

Example 6

Bottom Anti-Reflective Coating Formulation for 193 nm Exposure

In this example, a bottom anti-reflective coating was prepared by mixing 2.6% by weight of BOLTORN H40, 1.8% by weight of 4-hydroxybenzoic acid (a chromophore), 1.6% by weight of CYMEL 303LF, 0.3% by weight of PPTS, 49.6% by weight of PGME, and 44.0% by weight EL. The solution was coated onto a silicon wafer at 1500 rpm for 60 seconds, and then baked at 160° C. for 60 seconds. The film thickness was 142 nm measured on an ellipsometer. The refractive index, n, was 1.57 at a wavelength of 193 nm. The extinction coefficient, k, was 0.17 at a wavelength of 193 nm.

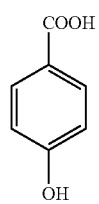

4-Hydroxybenzoic Acid

Example 7

Bottom Anti-Reflective Coating Formulation for 193 nm Exposure

In this example, a bottom anti-reflective coating was prepared by mixing 2.6% by weight of BOLTORN H40, 1.8% by weight of 3,4-dihydroxybenzoic acid (a chromophore), 1.6% by weight of CYMEL 303LF, 0.3% by weight of PPTS, 49.6% by weight of PGME, and 44.0% by weight EL. The solution was coated onto a silicon wafer at 1500 rpm for 60 seconds, and then baked at 160° C. for 60 seconds. The film thickness was 156 nm measured on an ellipsometer. The refractive index, n, was 1.53 at a wavelength of 193 nm. The extinction coefficient, k, was 0.16 at a wavelength of 193 nm.

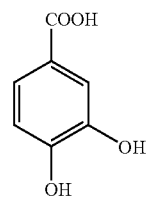

3,4-Dihydroxybenzoic Acid

Example 8

Bottom Anti-Reflective Coating Formulation for 193 nm Exposure

In this example, a bottom anti-reflective coating was prepared by mixing 1.8% by weight of BOLTORN H40, 0.9% by weight of Phenol Novolac PSM 4324 (a chromophore, available from Gun Ei Chemical, Industry CO. LTD), 0.5% by weight of CYMEL 303LF, 0.04% by weight of PPTS, 48.58% by weight of PGME, and 48.17% by weight EL. The solution was coated onto a silicon wafer at 1500 rpm for 60 seconds and then baked at 205° C. for 60 sec. The film thickness was 84 nm measured on an ellipsometer. The refractive index, n, was 1.54 at a wavelength of 193 nm. The extinction coefficient, k, was 0.29 at a wavelength of 193 nm.

Example 9

Performance Testing Methods

1. Ethyl Lactate Stripping Test

An ethyl lactate stripping test was carried out to determine the extent of the crosslinking reaction after baking. In this test, the particular formulation was spin-coated onto a 4-inch silicon wafer and then baked at 150° C. to 205° C. for 60 seconds. The initial film thickness was then measured using ellipsometry. After recording the thickness, the wafer was sprayed with ethyl lactate. The resulting puddle was left to stand for 10 seconds, and the wafer was spun at 2000-3500 rpm for 20-30 seconds. The wafer was then re-measured to determine the final film thickness. This final film thickness was subtracted from the initial film thickness to yield the amount of film stripping. Each of the formulations described in Examples 1-4 exhibited no stripping, thus indicating a very effective crosslinking reaction.

2. Etch Rate

Figure 3:
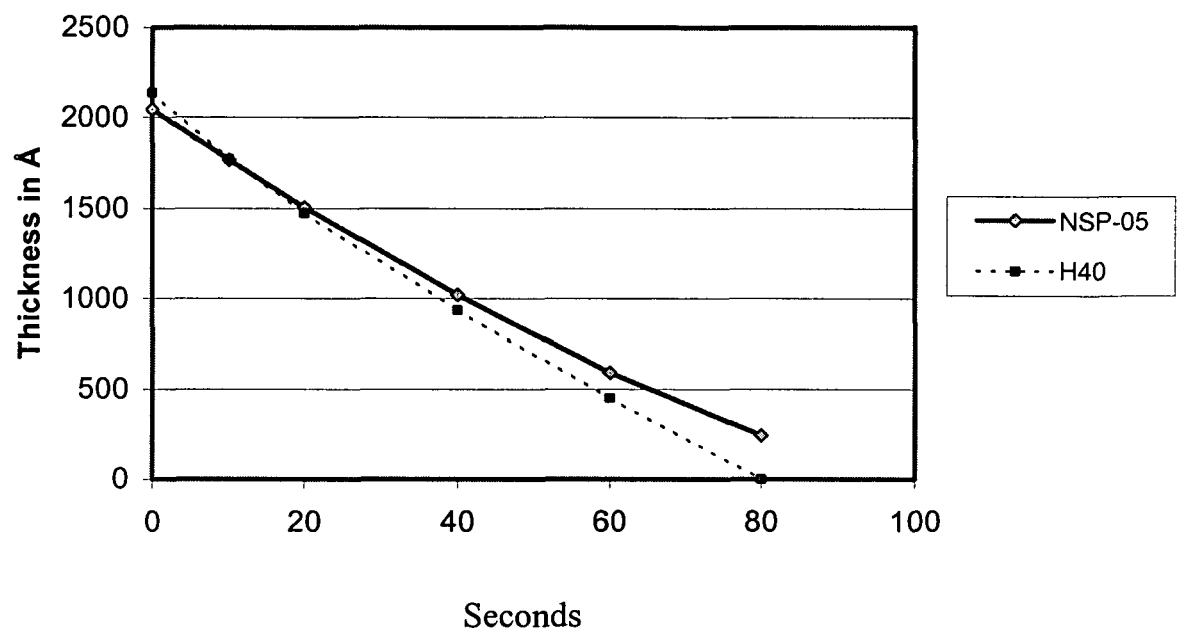
FIG. 3. a graph showing the film thickness versus the etching time of a hyperbranched polymer and a linear polymer.
Figure 4:
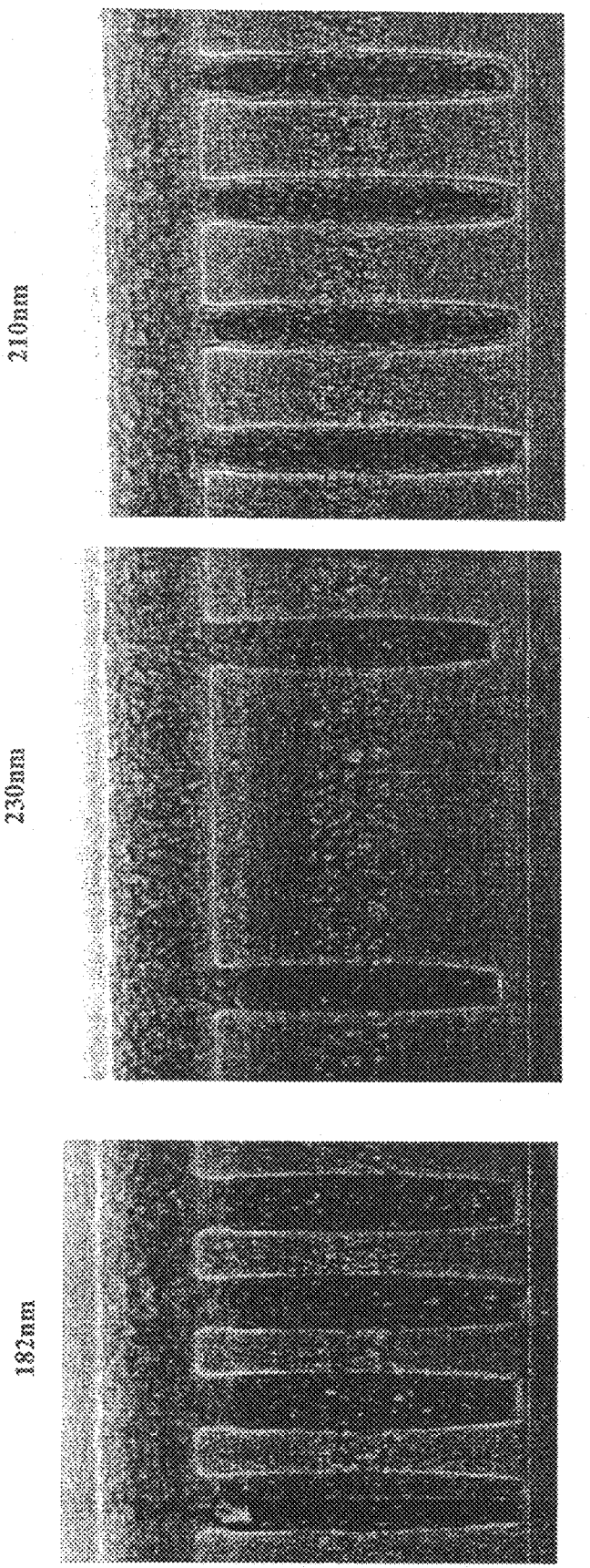
FIG. 4 shows three scanning electron microscope (SEM) photographs depicting respective cross-sectional views of substrates having respective via holes filled with a composition according to the invention.

The etch rate is an indicator of how fast the film will etch in a plasma. The etchant gas used was $CF_4$, and the flow rate was 40 sccm. The power applied was 100 W. The formulation of Example 1 was spin-coated onto a 4-inch silicon wafer and baked at 205° C. The initial film thickness was measured using ellipsometry. The wafer was placed in an etch chamber (a Reactive Ion Etcher manufactured by TRION Corp.) and subjected to $CF_4$ etching for a predetermined time. The film thickness was measured after the etch process. A graph of film thickness as a function of etch time was plotted, and the etch rate was determined from the slope of the curve. FIG. 3 shows such a plot for BOLTRON H40 and a linear polymer NSP-05 (a copolymer of glycidyl methacrylate and hydroxypropryl methacrylate, available from Nissan Chemical Industries, Japan). FIG. 4 shows an SEM photograph of a cured film from the formulation described in Example 1. The film covered the respective tops of vias of different densities: dense, semi-dense, and isolated. Across an 8-inch silicon wafer, the iso-dense bias was less than 50 nm.

Thus, compositions according to the invention can be utilized with substrates having a wide variation of iso and/or dense patterns. An Iso pattern is a pattern in which the distance between the center of a first hole and the center of an adjacent hole is at least about three times the diameter of the first hole. A Dense pattern is a pattern in which the distance between the center of a first hole and the center of an adjacent hole is about equal to or less than the diameter of the first hole.

Figure 5:
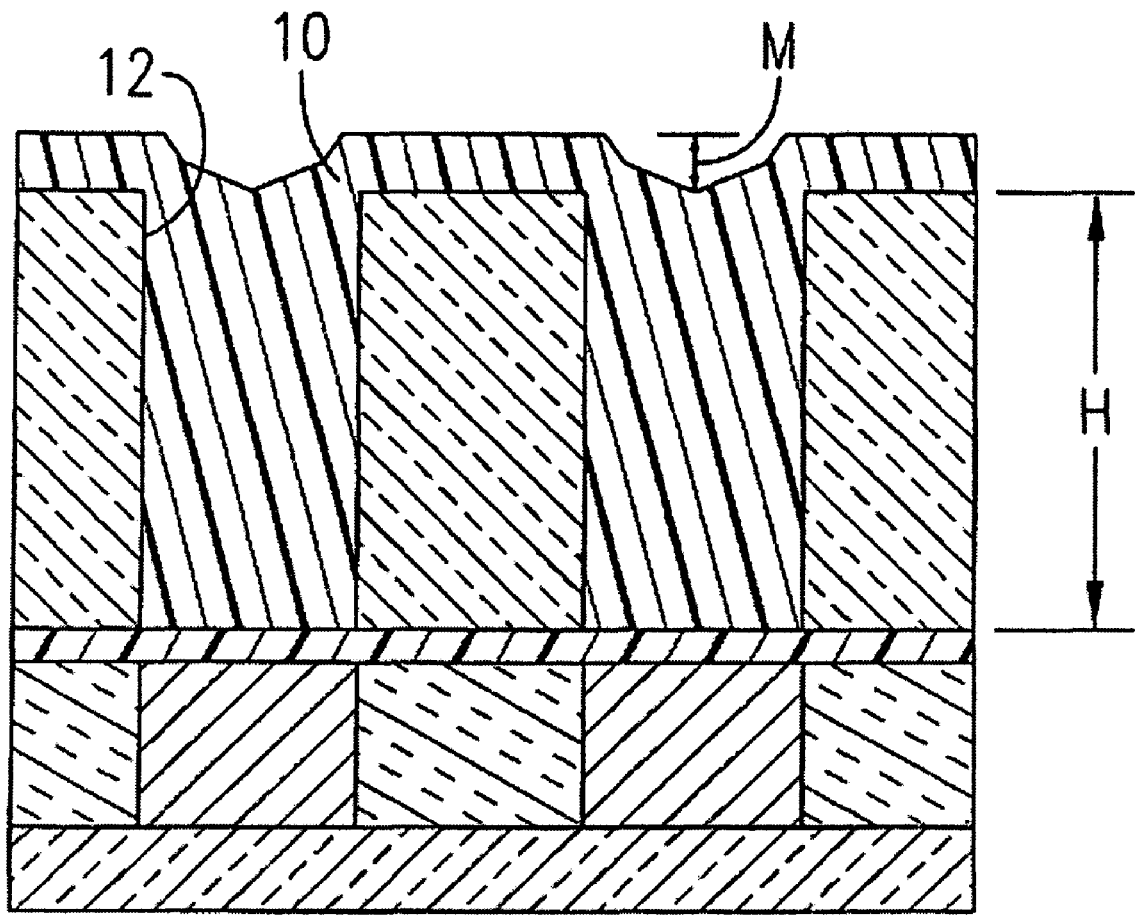
FIG. 5 is a schematic, cross-sectional view of a substrate having via holes formed therein where the holes are filled with a fill composition.

The degree of leveling of the cured inventive composition in contact or via holes should be at least about 90%, preferably at least about 92%, and more preferably at least about 95%. The degree of leveling of the anti-reflective coating is determined by observing (under a scanning electron microscope) the cross-sectional surface of a coated silicon wafer substrate. This can be better understood by referring to FIG. 5. As used here, the degree of leveling is determined as follows (where 100% means that complete leveling was achieved):

$$\text{Degree of leveling} = \left( \frac{1 - (\text{height of meniscus ``}M\text{''})}{\text{height ``}H\text{'' of the hole}} \right) \times 100,$$

wherein "M" and "H" are measurements taken from the cured material as shown in FIG. 5 where 10 represents the cured material in the hole 12. Specifically, "H" represents the height of the particular hole, and "M" represents the meniscus of the composition in the hole.

The inventive compositions can achieve such high degrees of leveling because they are highly and smoothly flowable, thus allowing a large number of holes to be filled smoothly, resulting in a substantially constant film thickness.

We claim:

1. In an anti-reflective or fill composition for protecting a base material or holes formed in a base material wherein the composition comprises a polymer and a crosslinking agent dispersed or dissolved in a solvent system, the improvement being that:
   said polymer is a dendritic polymer selected from the group consisting of dendritic polyesters, dendritic polyols, dendritic polyethers, dendritic polyamines, and mixtures thereof,
   said crosslinking agent is selected from the group consisting of melamines, glycourils, and mixtures thereof, and
   a light attenuating compound selected from the group consisting of 9-anthracene carboxylic acid, 9-hydroxy methyl anthracene, 3-hydroxy2naphthoic acid, 1,4-dihydroxy-2-naphthoic acid, 4-hydroxybenzoic acid, 3,4-hydroxy benzoic acid, and mixtures thereof.

2. The composition of claim 1, wherein said solvent system has a boiling point of from about 100-200° C.

3. The composition of claim 1, wherein said dendritic polymer is a hyperbranched polymer.

4. the composition of claim 1, wherein said composition has a viscosity of less than about 10 cP.

5. The composition of claim 1, wherein said solvent system includes a solvent selected from the group consisting of propylene glycol monomethyl ether, propylene glycol monomethyl ether acetate, ethyl lactate, propylene glycol n-propyl ether, cyelohexanone, tetrahydrofuran, dimethyl formamide, γ-butyrolactone, 2-heptanone, N-methyl pyrrolidone, and mixtures thereof.

6. the composition of claim 1, wherein said composition comprises from about 0.2-10% by weight dendritic polymer, based upon the total weight of the composition taken as 100% by weight.

7. The composition of claim 1, wherein said composition further comprises a catalyst.

8. The composition of claim 7, wherein said compound is a catalyst selected from the group consisting of sulfonic acids, carboxylic acids, and mixtures thereof.

9. The composition of claim 1, wherein said dendritic polymer has an average molecular weight of less than about 15,000 g/mole.

10. The composition of claim 1, wherein said dendritic polymer has a viscosity of less than about $150 \times 10^3$ cP.

11. The composition of claim 1, wherein said dendritic polymer has a hydroxyl number of at least about 100 mg KOH/g of dendritic polymer.

\* \* \* \* \*